June 11, 1968  A. T. DORTENZO ET AL  3,387,838
LANCE APPARATUS FOR TREATING MOLTEN METALS
Filed Oct. 22, 1965
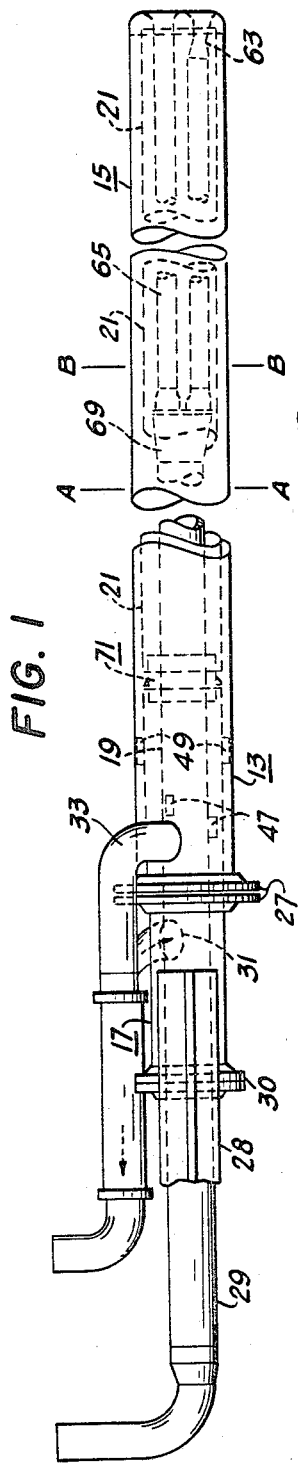
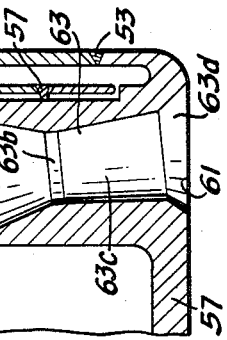
FIG. 4
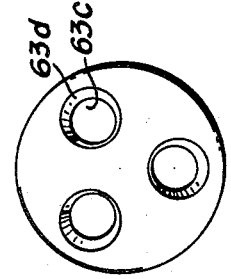
FIG. 6
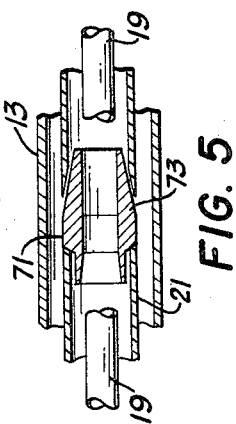
FIG. 5
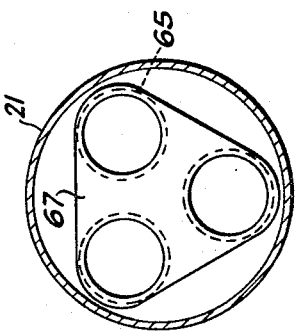
FIG. 3
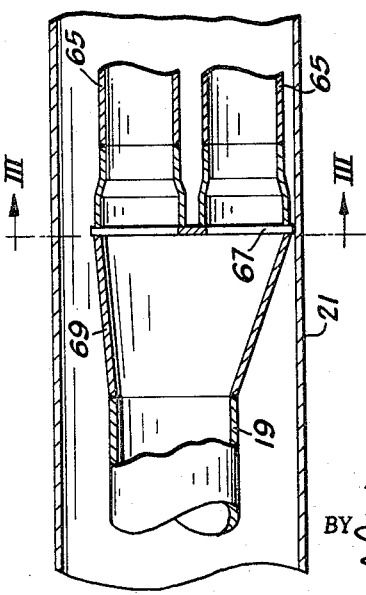
FIG. 2
INVENTORS
ALEXANDER T. DORTENZO &
FLOYD F. STANDLEY
BY Sherman H. Barber
their Attorney United States Patent Office 3,387,838
Patented June 11, 1968

3,387,838
LANCE APPARATUS FOR TREATING
MOLTEN METALS
Alexander T. Dortenzo, Pittsburgh, and Floyd F. Standley, Beaver, Pa., assignors to Koppers Company, Inc., a corporation of Delaware
Filed Oct. 22, 1965, Ser. No. 501,597
5 Claims. (Cl. 266—34)

ABSTRACT OF THE DISCLOSURE

A lance for treating molten metal comprises an outer envelope having at one end a lance tip closure with nozzles therein. An inner concentric conduit is connected to a frusto-conical transitional flow conduit having a perforated closure at the larger end. A plurality of parallel conduits connect the nozzles to the perforations in the closure of the transitional flow conduit.

---

This invention relates to steelmaking and more particularly to a blowing lance apparatus and a method for treating molten metal such as pig iron in a metallurgical furnace.

In the process of refining molten pig iron to steel, oxygen, of high purity, is injected into the steel refining apparatus which may be either a basic oxygen converter, an electric arc furnace, or an open hearth furnace, to remove impurities in the molten pig iron. The apparatus used to inject the oxygen heretofore has comprised an elongate steel tubular water cooled lance, which has a single central longitudinal passage through which the oxygen is conducted into the refining vessel. The lance is usually supported and mounted for vertical movement into and out of the refining vessel in such a manner that the oxygen and in some cases oxygen enriched air, impinges on the surface of the bath of molten metal at or near the central region thereof. Because the temperature within the refining vessel in the impingement zone may be as high as 6000° F., it is essential that the lance tip, which is preferably made of pure copper, be adequately water cooled.

It should be apparent though that the effectiveness of the refining oxygen depends upon the amount of molten metal it contacts in a unit of time. When, as in the prior art, there is only a single jet stream of oxygen emerging from a single nozzle in the lance tip, the oxygen impinges upon a certain surface area of molten metal. Whereas, when there are a plurality of oxygen jet streams which are arranged to provide an overlapping impingement pattern, as in the present invention, then there is a significant and considerable increase in the effectiveness of the present oxygen refining lance over the prior art devices due to the greater surface area on which the oxygen impinges.

The present invention contemplates a novel lance having a central tubular conduit and a plurality of annular oxygen nozzles in the lance tip through which the oxygen may be injected into the molten metal during the oxygen blowing period.

For a further understanding of the present invention and for advantages and features thereof, reference may be made to the following description taken in conjunction with the accompanying drawings which show for the purpose of exemplification a preferred embodiment of the invention.

In the drawings:

FIG. 1 is a schematic elevational view of a blowing lance in accordance with the invention;

FIG. 2 is an enlarged detail of the portion of the lance of FIG. 1 between lines AA and BB;

FIG. 3 is a sectional view along line III—III of FIG. 2;

FIG. 4 is an enlarged detail of a second portion of the lance of FIG. 1;

FIG. 5 is a detail view in section of a third portion of the lance of FIG. 1; and FIG. 6 is a view of the right-hand end of the lance of FIG. 1.

A top blowing oxygen lance in accordance with a preferred embodiment of the invention, designated generally as 11 in FIGS. 1 and 2, includes an outer generally cylindrical envelope 13, a lance tip portion 15 which is conveniently secured to one end of the tubular envelope 13, and a header portion 17 which is conveniently secured to the other end of the tubular envelope.

The outer cylindrical envelope 13 of FIG. 1 comprises a length of steel pipe, and within the envelope 13 there are two concentrically arranged and spaced apart tubular conduits 19, 21.

The header portion 17 is conveniently connected to the upper end of the envelope 13 by means of a pair of matching flanges 27, but, of course, welding or any other suitable connecting means may be employed if preferred. The header portion 17 may be fitted with a pivotal bail 28, for use in supporting the lance 11 in a vertical operative position.

An oxygen inlet conduit 29 is connected to the top of the header portion 17 by means of flanges 30, and cooling water inlet 31 and outlet 35 conduits are connected to the header portion 17, about where shown, by welding or in any other suitable manner.

The innermost conduit 19 is spaced apart from the conduit 21 by a pair of spacer rings 47 which slidably engage the inner surface of the conduit 21, and the conduit 21 is likewise spaced from the envelope 13 by means of a plurality of other spacers 49.

Referring to FIG. 4, it will be noted that the outer cylindrical envelope 13 is connected to the lance tip portion 15 by means of welding at a joint 51. The lower end portion of the lance tip portion 15, as seen in FIG. 4, which is actually the bottom of the lance when assembled, shown in FIG. 1, is closed by a nozzle plate 57 having therein a plurality of, preferably 3, annular apertures 61, which are regularly, angularly spaced about the central axis of the lance 11. The lower end of the inner conduit 21 is welded at 57 to the nozzle plate 57, as shown in FIG. 3, but between the nozzles 63 the conduit 21 terminates in spaced relation to the inner surface of the nozzle plate 57 and serves as a baffle for the flow of cooling water in the manner described hereinafter. The apertures 61, in a preferred embodiment of the invention, are the terminals of interior fluid conducting nozzles 63 which are formed integrally with the nozzle plate 57, as shown in FIG. 4. The axis of each nozzle 63 is biased with respect to the central axis of the lance 11 at an angle typically of about 6°. Such an angle of course may vary with any particular installation. The inner or upper ends of the nozzles 63 (as viewed in FIG. 4) are welded to the ends of tubular conduits 65, and the other ends of the conduits 65 are welded to a distributor plate 67, as indicated in FIG. 2. The distributor plate 67 is welded to one end of a frusto-conical transition piece 69 which connects the innermost conduit 19 to the distributor plate 67 and the conduits 65.

Within the envelope 13, there is also an expansion joint 71 which is longitudinally spaced from the transition piece 69 as shown in FIG. 1; the expansion joint being connected to and between adjacent lengths of conduit 21. The expansion joint 71 (see FIG. 5) is comprised of a generally frusto-conical main body portion 73 which has a recessed shoulder at one end to which is welded one end of the conduit 21. The frusto-conical main body portion 73 fits within the end portion of the adjacent length of conduit 21; the inner wall of conduit 21 being tapered to approximately the same slope as the frusto-conical surface of the main body portion 73.

In operation, the lance 11 may be supported by the bail 28 in a vertical position and prepared for lowering into a conventional metallurgical furnace such as a basic oxygen furnace, an open hearth furnace, and the like. A source of oxygen is connected to the oxygen inlet conduit 29 and a source of cooling water is connected to the inlet conduit 31. Likewise, a cooling water discharge conduit is connected to the conduit 33 in the customary manner.

The lance 11 is then ready to be lowered into the metallurgical furnace as soon as cooling water flows into and out of the lance. The cooling water enters the lance inner annular space between conduits 19 and 21 flowing downward into the nozzle tip and around the nozzles 63 and the conduits 65. The cooling water circumvents the end of the inner conduit 21 and then flows upward in the annular space between the conduits 21 and 13, exiting from the lance via the conduit 33.

During the oxygen blowing period, oxygen enters the lance via the conduit 29 and flows downward within the lance central axial conduit 19 to the transition piece 69. Thence, the oxygen flow diverts into the three conduits 65 and emerges from the nozzles 63 at apertures 61.

Each nozzle 63 generally comprises a convergent first portion 63a, a cylindrical middle portion 63b, a first divergent portion 63c and a second divergent portion 63d. The oxygen flow in each tube 65 first enters the convergent section 63a wherein the velocity of the oxygen is significantly increased. Thence the oxygen passes through the portion 63b of constant diameter and enters the first divergent region 63c wherein the pressure builds up and the velocity decreases only but slightly. When the oxygen leaves the nozzle at the aperture 61 it has attained the desired velocity and pressure characteristics to effectively impinge against the molten metal in the metallurgical furnace.

A feature of the present invention is that the oxygen which emerges via the three mutually divergent nozzles 63 impinges on a greater area of the molten metal and is therefore more effective in refining the metal.

Additionally, the divergent flow of oxygen from the lance via the nozzles 63 increases the effectiveness of the lance when used to "melt down" scrap metal in a metallurgical furnace.

A particular advantage resulting from the arrangement of the concentric conduits 13, 19, 21 and the three parallel conduits 65 is that the cooling fluid is conducted to the hottest regions of the nozzle tip which is in the lower extremities of the lance tip and adequate cooling of these hottest regions is assured.

By oxygen, of course, is meant to include oxygen and oxygen-enriched air.

Although the invention has been described herein with a certain degree of particularity, it is understood that the present disclosure has been made only as an example and that various modifications and changes may be made within the scope of the invention as defined by the appended claims.

What is claimed is:
1. A lance apparatus for treating a bath of molten metal comprising:
 (a) an elongate tubular envelope having a longitudinal axis;
 (b) a closure fixed to one end of said envelope;
 (c) a plurality of spaced apart fluid passages through said closure;
 (d) a concentric first conduit within and annularly spaced from said envelope and terminating in adjacent spaced relation to said closure;
 (e) a plurality of spaced apart second conduits in said closure arranged parallelly to said axis, each said second conduit connecting a respective fluid passage;
 (f) a concentric third conduit within and annularly spaced from said first conduit;
 (g) a transitional flow conduit having a frusto-conical form connected to said third conduit and having a perforated closure at the larger end with each of said second conduits being attached to said closure at a perforation;
 (h) means to flow a refining fluid in said third conduit whereby said fluid is diverted in said transitional flow conduit into said second conduits as separate streams of fluid; and
 (i) means to flow cooling fluid in the annular passage between said first and third conduits in the direction toward said closure and thence in the opposite direction in the annular passage between said first conduit and said envelope, said cooling fluid surrounding said second conduits and cooling said closure.

2. A lance apparatus for treating a bath of molten metal comprising:
 (a) an elongate outer first conduit;
 (b) a first closure attached to one end of said first conduit and having therein a plurality of spaced apart fluid passages angularly divergent from the axis of said lance;
 (c) a second conduit concentrically arranged within said first conduit and annularly spaced therefrom, said second conduit terminating in adjacent spaced relation to said closure;
 (d) a third conduit concentrically arranged within and annularly spaced from said second conduit;
 (e) a plurality of fourth conduits angularly arranged within and spaced from said second conduit each said fourth conduit connecting a respective fluid passage in said closure;
 (f) a transitional flow conduit having a frusto-conical form connected to one end of said third conduit and having a perforated closure at the larger end thereof, each said fourth conduits being fluidly connected to said closure at a perforation therein, whereby fluid flowing in said third conduit as a single stream is diverted in said transitional conduit into said plurality of fourth conduits and exits said lance via said plurality of fluid passages as separate streams of fluid;
 (g) a second closure fixed to said first conduit at the other end thereof;
 (h) a conduit piercing said second closure and connecting said third conduit;
 (i) means to introduce fluid into the annular space between said third and said second conduits whereby said fluid flows in said annular space in a first direction toward said first closure and surrounds said fourth conduits, and flows thence in the opposite direction in the annular space between said first and said second conduits; and
 (j) means adjacent said second closure connecting the annular space between said first and second conduits whereby said cooling fluid exits said lance.

3. The invention set forth in claim 2 including:
 (a) an expansion joint interconnecting adjacent ends of said second conduit comprising
  (i) a frusto-conical tubular body portion attached to one end of a first portion of said second conduit with the sloping portion of said frusto-conical body portion being disposed in the end portion of the adjacent second portion of said second conduit, the wall of said second conduit being tapered to generally conform to the slope of the frusto-conical body portion; and with
 (b) said expansion joint surrounding said third conduit in spaced apart relation thereto.

4. The invention set forth in claim 2 wherein:
(a) the fluid passages in said first closure are nozzle shaped.

5. The invention set forth in claim 4 including:
(a) spacer pieces disposed in the annular passage between said first and said second conduits for maintaining said conduits in spaced apart relation; and
(b) spacer pieces disposed in the annular passage between said second and said third conduits for maintaining said conduits in spaced apart relation.

References Cited

UNITED STATES PATENTS

| | | | |
|---|---|---|---|
| 2,863,656 | 12/1958 | Cox | 266—34 |
| 2,937,864 | 5/1960 | Kesterton | 266—34 |
| 3,065,916 | 11/1962 | Kurzinski | 266—34 |
| 3,170,016 | 2/1965 | Grace | 266—34 |
| 3,291,471 | 12/1966 | Heyer | 266—34 |

J. SPENCER OVERHOLSER, *Primary Examiner.*

E. MAR, *Assistant Examiner.*